United States Patent [19]
Shachnai et al.

[11] Patent Number: 5,544,313
[45] Date of Patent: Aug. 6, 1996

[54] BATON PASSING OPTIMIZATION SCHEME FOR LOAD BALANCING/CONFIGURATION PLANNING IN A VIDEO-ON-DEMAND COMPUTER SYSTEM

[75] Inventors: Hadas Shachnai, Somers; Joel L. Wolf, Goldens Bridge; Philip S. Yu, Chappaqua, all of N.Y.

[73] Assignee: International Business Machines Corporation, Armonk, N.Y.

[21] Appl. No.: 241,087

[22] Filed: May 11, 1994

[51] Int. Cl.$^6$ .......................... G06F 13/14; H04N 7/173
[52] U.S. Cl. ..................... 395/200.01; 348/7; 395/600; 364/966.1; 364/264
[58] Field of Search ........................... 395/650, 6, 600, 395/486, 275, 444; 380/20; 348/7; 364/401

[56] References Cited

U.S. PATENT DOCUMENTS

| | | | |
|---|---|---|---|
| 4,207,609 | 6/1980 | Luiz et al. | 364/290 |
| 4,394,730 | 7/1983 | Suzuki et al. | 364/200 |
| 4,703,422 | 10/1987 | Kinoshita et al. | 364/200 |
| 5,168,353 | 12/1992 | Walker et al. | 358/86 |
| 5,172,413 | 12/1992 | Bradley et al. | 380/20 |
| 5,345,584 | 9/1994 | Hill | 395/600 |
| 5,371,532 | 12/1994 | Gelman et al. | 348/7 |
| 5,383,112 | 1/1995 | Clark | 364/401 |
| 5,423,018 | 6/1995 | Dang et al. | 395/425 |

OTHER PUBLICATIONS

ACM Sigmetics Conference, Santa Fe, NM (1988) "Optimal Allocation of Multiple Class Resources in Computer Systems", Tantawi et al.
MIT Press, 1988, "Resource Allocation Problems; Algorithmic Approaches", Toshihide Ibaraki & Naoki Katoh, pp. 106–121.
Cambridge University Press, 1986, "Numerical Recipes; The Art of Scientific Computing", William H. Press, et al., Section 9.1.
ACM Sigmetics Conference, Berkeley, CA (1989) "The Placement Optimization Program: A Practical Solution to the Disk File Assignment Problem", Wolf.
Tetzaff, William, A Methodology for Evaluating Storage Systems in Distributed and Hierarchical Video Servers, IEEE, pp. 430–439 1994.
Tobagi, Fouad A., Client–Server Challenges for Digital Video, IEEE, pp. 88–91 1992.
Gelman Alexander D., An Architecture for Interactive Applications, IEEE, pp. 848–852 1993.
Lougher, P., Scalable Storage Servers for Digital Audio and Video, IEEE, pp. 140–143 1994.

*Primary Examiner*—Thomas C. Lee
*Assistant Examiner*—Duo Chen
*Attorney, Agent, or Firm*—Whitham, Curtis, Whitham & McGinn; Richard M. Ludwin

[57] ABSTRACT

A video on demand computer system includes a plurality of storage media each storing a plurality of videos. The storage media are disks attached to a computer system. The computer system plays the videos on demand by reading out the videos from the disks as data steams to play selected ones of the videos for users responsive to received user performance requests. The computer system is programmed to monitor the numbers of videos being performed for each of the disks. Based on the monitoring function performed by the computer system, the computer system performs a load balancing function by transferring the performance of a video in progress from one of the disks to another disk having a copy of the video in progress. The computer system periodically performs a reassignment function to transfer videos between the disks to optimize load balancing based on the user performance requests for each of the videos. There are two phases to the load balancing performed by the computer system; a static phase and a dynamic phase. In the static phase, videos are assigned to memory and disks, and in the dynamic phase there is provided a scheme for playing videos with minimal and balanced loads on the disks. The static phase supports the dynamic phase which insures optimal real-time operation of the system. Dynamic phase load balancing is accomplished by a process of baton passing.

9 Claims, 6 Drawing Sheets

BATON PASSING OPTIMIZATION SCHEME FOR LOAD BALANCING/CONFIGURATION PLANNING IN A VIDEO-ON-DEMAND COMPUTER SYSTEM

BACKGROUND OF THE INVENTION

1. Field of the Invention

The present invention generally relates m management of storage devices by a file server in a multimedia computer system and, more particularly, m an optimization scheme for load balancing/configuration planning in a video-on-demand computer system, sometimes called a movie-on-demand computer system.

2. Description of the Prior Art

Pay-for-view movies have been an increasingly popular service provided by cable TV operators and hotels for their subscribers and guests. The pay-for-view movies are typically stored on video cassette tape in analog form. The video cassettes may be loaded into a carousel which is programmed m play the movies at predetermined times. A subscriber or guest, having a set top converter, may select a movie, and that movie will be played at the subscriber's or guest's TV set at the programmed time. The subscriber or guest is automatically billed for the service.

This service, however, is not always convenient m subscribers and guests since movie selections are scheduled for certain time slots which may not fit a subscriber's or guest's schedule. More recently, movie-on-demand services are being provided which allow subscribers and guests to select a movie from a menu of available movies to be played on the subscriber or room TV at any time. This is made possible by storing the movies in digital form on magnetic disk and/or system random access memory (RAM). A movie stored on disk is first read into system memory and then read out as a data stream which is used to generate the analog TV signal that is supplied to a subscriber's or guest's TV set. If the movies which are played for a subscriber or guest are stored statically in system memory, read out can occur at any time without the limitations represented by the dynamic analog storage used in pay-for-view systems.

Movie-on-demand computer systems must be able to "play" multiple streams of many movies simultaneously. These movies may reside in memory or on one or more disks in the system. While a projection can be made as to the expected demand for any given movie currently available, the demand can vary widely. This in turn can cause a number of problems that will degrade the performance of the system. For example, perhaps the three most popular movies may be loaded from disk into system memory for play, but because of the limitations of system memory, the other movies available for play reside on disk. A portion of system memory is reserved to "page" in movies from disk as the movies are requested by subscribers and guests. Multiple copies of the more popular movies reside on multiple disks, although the number of copies will vary depending on the current popularity of the movies. Without some way to balance the load or demand on the several disks in the system, more requests to read a movie from a given disk may be made than can be serviced, with the inevitable result that service to subscribers and guests is degraded or even interrupted. This is an unacceptable situation, particularly where the subscribers and guests are paying a premium fee for the service.

SUMMARY OF THE INVENTION

It is therefore an object of the present invention to provide a solution to the problem of minimizing and balancing the load on the disks, thus enabling service to a larger number of concurrent customers for a given system configuration.

It is another object of the invention to solve the related configuration planning problem of determining how much memory and/or how many disks the movie-on-demand system needs to safely meet its playing requirements at minimal cost.

According to the present invention, the disk load minimization and balancing problem is solved by (1) determining statically which movies should reside in memory and which disks should have copies of the remaining movies, (2) determining dynamically which disk copies of the various movies should be used to play the customer demands, and (3) implementing dynamic adjustments to the streams via a technique we will refer to as movie baton passing. Solving this load balancing problem enables the movie-on-demand system to support a larger customer load with a given memory and disk configuration. In addition, the invention can be used to solve the related configuration planning problem of determining how much memory and/or how many disks the movie-on-demand system needs to safely meet its playing requirements at minimal cost.

The invention solves two related movie-on-demand problems. The first is disk load balancing which has as input constraints existing memory and disk configuration and forecasted and actual movie loads. The solution of this problem has a static phase and a dynamic phase. In the static phase, movies are assigned to memory and disks, and in the dynamic phase there is provided a scheme for playing movies with minimal and balanced loads on the disks. The static phase supports the dynamic phase which insures optimal real-time operation of the system. The invention accomplishes dynamic phase load balancing by a process of baton passing which, as will become clear from the detailed description of the invention, is referred to as "DASD dancing". The static phase decides the DASD placement of the movie replicates in such a way that it can (1) maximize the likelihood that for any pair of DASD, if one is overloaded and the other is underloaded, the baton passing approach can be used to balance the load between the overloaded DASD and the underloaded DASD by making a sequence of load shifts across different DASDs, and (2) minimize the number of load shifts required.

The movies stored on the underloaded DASD may be completely different from those stored on the overloaded DASD; however, the load balancing can be achieved from a sequence of shifts across different DASDs where each shift causes the transfer of the performance of a video from one of the DASDs (the source) to another DASD (the target) having a copy of a movie being shifted, and the source becomes the target DASD for the next load shift. Thus, the underloaded DASD is the target of the first load shift and the overloaded DASD is the source of the last shift. The final load on the intermediate DASDs in the sequence is not changed.

The goal of the solution to the first problem is to maximize the ability to handle the load given a fixed cost configuration. The second, related problem is configuration planning which has as input consultants forecasted movie loads and memory and disk costs. The solution to this problem is a configuration which minimizes system costs while meeting movie play requirements. The goal of this solution is to minimize configuration costs given a fixed load.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
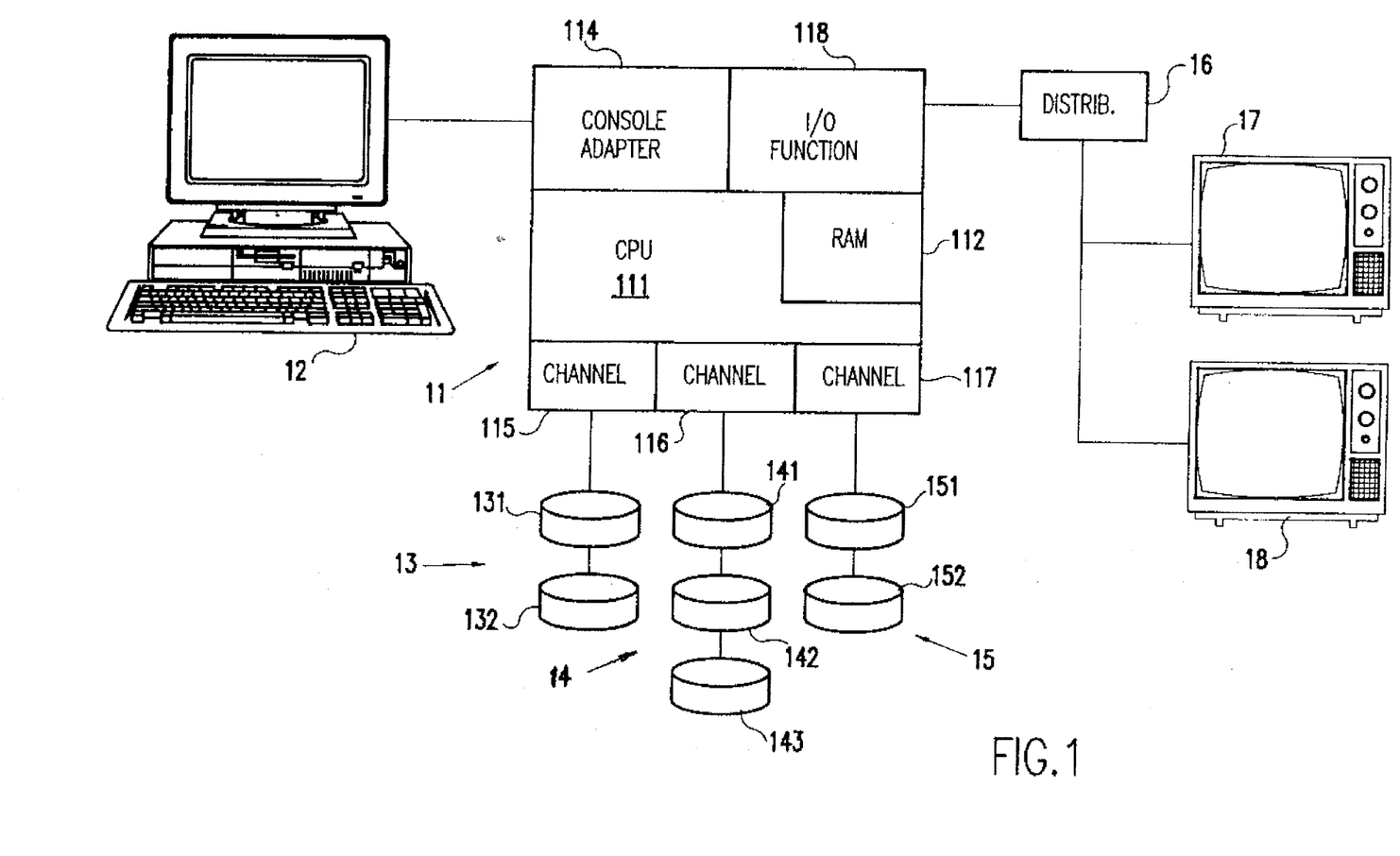
FIG. 1 is a functional block diagram of a computer system on which the invention is implemented.

Referring now to the drawings, and more particularly to FIG. 1, there is shown a computer system on which the subject invention may be implemented. The computer system may be for example a mainframe computer, such as the International Business Machines (IBM) Corp. System 390 class of computer, or one of the newer IBM Scalable Powerparallel Systems 9076 or any such other computer system capable of supporting sufficient input/output (I/O) functions to support the movie-on-demand function of the invention. The computer system comprises a system unit 11 which houses the central processing unit (CPU) 111 connected to system memory (RAM) 112. An operator communicates with the computer via a central console 12 which is connected to the CPU 111 via a console adaptor 114. The CPU 111 is connected by a plurality of channels 115, 116 and 117 to a plurality of direct access storage device (DASD) strings 13, 14 and 15, respectively. Each DASD string has one or more DASDs connected in a daisy chain. The number of channels and DASDs on a string will vary, depending on the specific installation. In the example illustrated, DASD string 13 comprises DASDs 131 and 132, DASD string 14 comprises DASDs 141, 142 and 143, and DASD string 15 comprises DASDs 151 and 152. The DASDs are typically magnetic disks capable of storing a large amount of data. Data read from the DASDs are stored in system memory 112 from which it is read out to input/output (I/O) function 118.

Computer systems like that shown in FIG. 1 have been used for other applications, including transaction processing and database management. Such applications are supported by an operating system (OS), such as IBM's Multiple Virtual Storage (MVS) OS or IBM's AIX OS. AIX is IBM's enhanced version of the UNIX® operating system (UNIX® is a registered trademark of Novell, Inc.). Characteristic of such applications are that data is both read and written to the DASDs, whereas in the present movie-on-demand application, data is only read from the DASDs. Writing occurs only in the initial configuration and in the static phase when movies are written to selected disks. There is, however, no modification of the data, merely duplication. Furthermore, while transaction processing and data base management applications are functionally improved by high speed operation, the present application requires real-time operation; anything less is unacceptable. The data streams from the I/O function 118 are output to distribution system 16 which supplies video signals to subscriber or guest TV sets 17 and 18.

Thus, the movie-on-demand application has certain properties that differentiate it from prior applications on mainframe computers. First, a data stream from a DASD is a logically defined unit which is read-only. All data streams may be viewed as equal; that is, bits/second data rates are independent of the movie being read out. Moreover, the data streams generated by the system are basically predictable, both in forecasts and in real-time. Second, the real-time scheduling requirements of the movie-on-demand system mean that each disk can satisfy some maximum number of concurrent data streams, making load balancing crucial. This requirement, however, can be offset by making multiple copies of popular movies on several different DASDs. This flexibility is further enhanced by the present invention which takes advantage of the multiple copies of the movies on several DASDs to redistribute the load or demand on the DASDs by a process of baton passing, described in more detail hereinafter. The process of baton passing is sometimes referred to hereinafter as "DASD dancing" for reasons which will become apparent as the description of the invention progresses.

While the computer system shown in FIG. 1 is typical and has been described in terms of current or known computer systems and I/O devices, it will be understood by those skilled in the art that the invention is not limited to these specific computer systems and I/O devices. Clearly, as new advances are made in computer hardware, there will be other and newer platforms on which the invention may be implemented. Therefore, in the remaining description, the computer system will be referred to as a "multi-media server", movies will be referred to as "videos", and the storage devices will be referred to as "disks" rather than DASDs. Here "disks" mean storage devices, whether a geometric disk or some other configuration, on which the data can be stored. These may include, for example, disk arrays, magneto-optic disks and other technologies.

There are two components to the invention. The first component is a load balancing scheme, and the second component is a configuration planning scheme. The load balancing scheme proceeds in two stages, one static and one dynamic. In the static stage, a good quality assignment of which videos should reside in memory and which disks should have copies of the remaining videos is computed. These assignments are adjusted incremetally, for example on a daily basis. As many of the videos as possible with the largest demand are placed into system memory 113. Depending on system memory limitations, this may be for example three videos, out of a total of 100 or more, allowing additional system memory for paging data from several of the attached disks. The videos in system memory 113 can be played on demand without further consideration.

Assume that there are M remaining videos and a total of D disks. (By disk here we mean either a single physical disk or a group of striped disks.) In the remaining portion of the static phase, we seek to provide a good quality video/disk assignment matrix $(a_{ij})$. This is a (0,1) M×D matrix such that $a_{ij}=1$ if video i is placed on disk j, and $a_{ij}=0$ otherwise. To motivate what constitutes goodness in this assignment, we first describe the dynamic phase of our scheme. This phase handles the on-line decisions of which disk copies of the videos not in memory should be used to actually handle the current demand stream.

Figure 2:
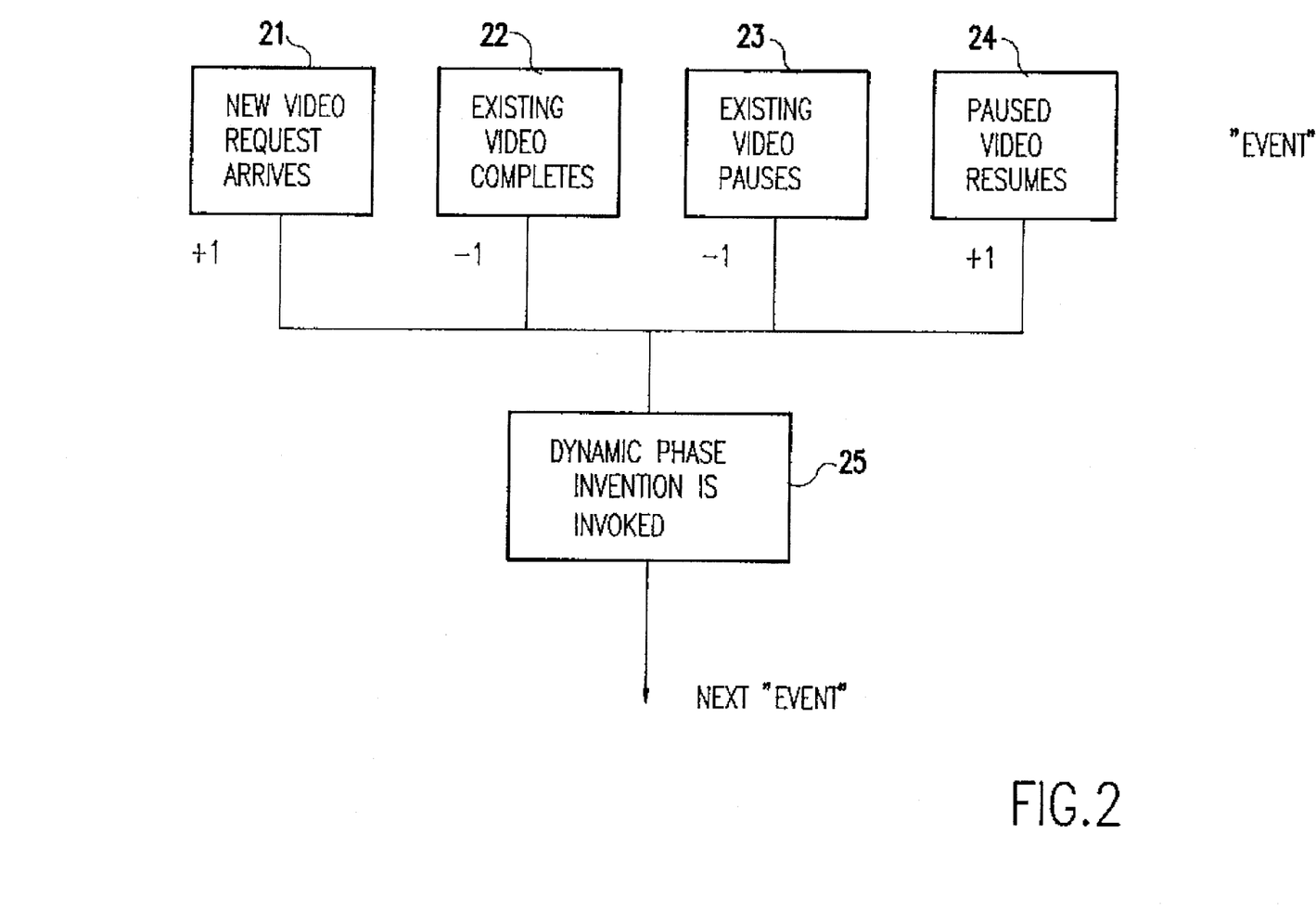
FIG. 2 is a functional block diagram of the interaction between video events and the dynamic phase of the invention.

FIG. 2 illustrates the various events which will invoke the dynamic phase of the invention. The first event is a request for the playing of a video, as indicated in block 21. This event has the effect of adding a data stream. The second event is the completion of the playing of a video, as indicated in block 22. This event has the effect of ending a data stream. In addition to starting and stopping videos, subscribers and guests are provided with the option of pausing and resuming play of a video, just as may be done when using a home video cassette recorder (VCR). The digital technology of videos-on-demand make this feature possible. Thus, when a subscriber or guest pauses the playing of a video, as indicated by block 23, this event has the effect of suspending (i.e., ending temporarily) a data stream. Later, when the subscriber or guest resumes the playing of the paused video, as indicated in block 24, this event has the effect of adding a data stream. Each of these events invokes the dynamic load balancing phase 25 of the invention, which will now be described in more detail.

Assume that there are currently $\lambda_i$ streams of video i in progress, broken down further into $\lambda_{ij}$ streams on disk j. Thus, $$\lambda_i = \sum_{j=1}^{D} \lambda_{ij}$$

and $\lambda_{ij}=0$ whenever $a_{ij}=0$. Associated with each disk j is a maximum number $L_j$ of concurrent streams (i.e., playing videos). This number depends on the performance characteristics of the disk and is chosen to ensure that the real-time scheduling problem of reading the videos within the required fixed deadline is achieved. To balance the load on the disks, we assume a penalty function $F_j$ for each disk j, defined as a convex increasing function on the set $\{0, \ldots, L_j\}$. The load will be as balanced as is possible given the current load and video/disk assignments when the function $$\sum_{j=1}^{D} F_j \left( \sum_{i=1}^{M} x_{ij} \right)$$

is minimized subject to the constraints (1) $x_{ij} \in \{0, \ldots, L_j\}$, $$(2) \sum_{j=1}^{D} x_{ij} = \lambda_i,$$

and (3) $x_{ij}=0$ if $a_{ij}=0$. This problem is a so-called class constrained resource allocation problem and can be solved exactly and efficiently using a graph-theoretic optimization algorithm as described, for example, by A. Tantawi, D. Towsley and J. Wolf, "Optimal Allocation of Multiple Class Resources in Computer Systems," ACM Sigmetrics Conference, Santa Fe N. Mex., 1988. For the optimal solution, $$x_j = \sum_{i=1}^{M} x_{i,j}$$

represents the desired load on disk j. Thus, reindexing the disks according to increasing values of $$x_j - \sum_{i=1}^{M} \lambda_{ij}$$

puts them in order of most overloaded to most underloaded. Ideally, these values should all be close to zero. To fix notation, suppose that the first $D_1$ disks are overloaded and the last $D_2$ disks are underloaded.

Summarizing the notation used in this description,

Non-memory resident videos $i=1,\ldots,M$;

Disks $j=1,\ldots,D$;

Video/disk assignment matrix $(a_{ij})$;

Maximum stream load per disk $L_j$;

Disk penalty function $F_j$, which is a convex function; and

Current load $$\lambda_i = \sum_{j=1}^{D} \lambda_{ij},$$

where $\lambda_{ij}$ is the number of "plays" of video i on disk j, $\lambda_i$ is the total demand for video i, and $\lambda_{ij}=0$ whenever $a_{ij}=0$ (i.e., if the video is not there, it can not be played).

Figure 3:
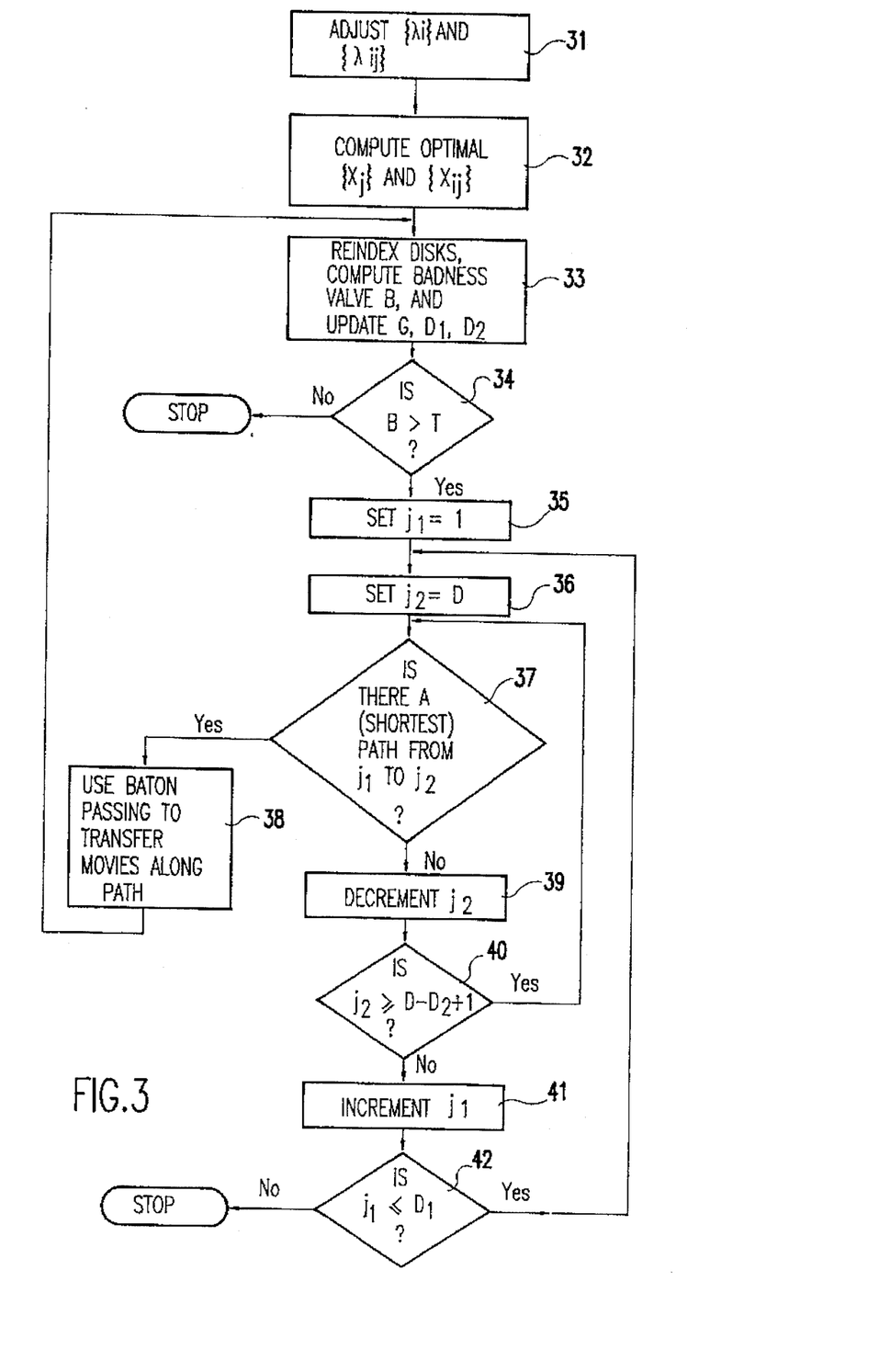
FIG. 3 is a flow chart of the logic of the dynamic phase of the invention.

With reference now to FIG. 3, there is shown the process of the dynamic phase according to the invention. In the first step 31, $\lambda_i$ and $\{\lambda_{ij}\}$ as defined above are adjusted. Next, the graph-theoretic optimization algorithm described by A. Tantawi et al., supra, is used in step 32 to compute optimal values $x_j$ and $\{x_{ij}\}$.

Stream demands are increased by one when a subscriber or guest starts a new video or resumes a currently paused video, as illustrated in FIG. 2. Similarly, stream demands are decreased by one when a subscriber or guest finishes a video or pauses a currently playing video. Normally, handling demand increases can be accomplished by employing a greedy algorithm; that is, an algorithm which provides a local optimal solution while ignoring the global picture. In other words, if a new stream of video $i_1$ is to be added, that disk j satisfying $a_{i_1j}=1$ whose first difference $$F_j \left( \left( \sum_{i=1}^{M} \lambda_{ij} \right) + 1 \right) - F_j \left( \sum_{i=1}^{M} \lambda_{ij} \right)$$

is minimal is chosen. However, periodically this approach will degrade. If the values $$\left| x_j - \sum_{i=1}^{M} \lambda_{ij} \right|$$

differ from zero by more than some fixed threshold T according to any reasonable norm, the dynamic phase algorithm will be initiated. For example, the norm could computed as the sum of squares:

The initiated algorithm is also graph-theoretic, maintaining at all times a $$B = \sum_{j=1}^{D} \left( x_j - \sum_{i=1}^{M} \lambda_{ij} \right)^2$$

directed graph G defined as follows:

Nodes are disks;

For each pair $j_1$ and $j_2$ of distinct nodes, there is a directed arc from $j_1$ to $j_2$ provided there exists at least one video $i_1$ for which
  (1) $a_{i_1,j_1}=a_{i_1,j_2}=1$, meaning that a particular video $i_1$ exists on both disk $j_1$ and $j_2$
  (2) $\lambda_{i_1j_1}>0$, meaning that video $i_1$ is being played on disk $j_1$, and
  (3)

$$\sum_{i=1}^{M} \lambda_{ij_2} < L_{j_2},$$

meaning that disk $j_2$ has excess capacity.

Figure 4:
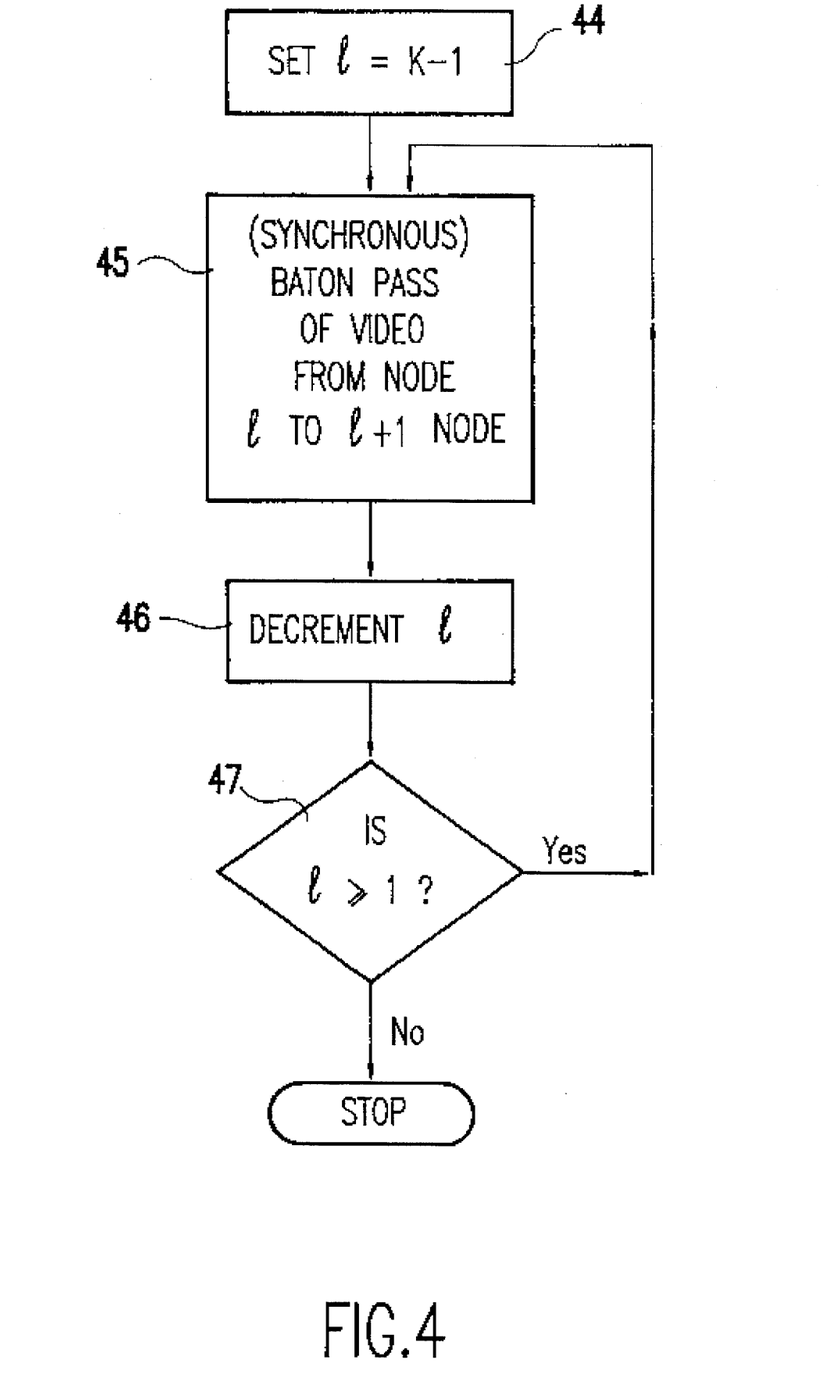
FIG. 4 is a flow chart of the logic of the baton passing component of the dynamic phase of the invention.

Referring again to FIG. 3 the disks are indexed according to increasing lead, the badness value B is computed and graph G and the quantities $D_1$ and $D_2$ are updated in step 33. Then a decision is made in step 34 as to whether B is greater than T. If not, the process stops; otherwise, $j_1$ is set to 1 in step 35 and $j_2$ is set to D in step 36. A decision is then made in step 37 as to whether there is a shortest path from $j_1$ to $j_2$. Existence of directed arc from $j_1$ to $j_2$ signifies the potential for transferring a single stream of some video on-line from one disk to another without exceeding the lead capacity of the receiving disk. If there is a shortest path from $j_1$ to $j_2$, then the baton passing scheme described below and illustrated in FIG. 4 is invoked in step 38, and the process loops back to step 33. If there is not a shortest path from $j_1$ to $j_2$, then $j_2$ is decremented in step 39 and a decision is made in step 40 as to whether $j_2$ is greater than or equal to $D-D_2+1$. If so, the process loops back to step 37; otherwise, $j_1$ is incremented in step 41. After incrementing $j_1$, a decision is made in step 42 as to whether $j_1$ is less than or equal to $D_1$. If so, the process loops back to step 36; otherwise, the process ends (unsuccessfully).

FIG. 4 shows the logic of the baton passing process invoked in step 38 of FIG. 3. Assume that the shortest path from disk $j_1$ is to disk $j_2$ consists of k nodes, indexed by 1, the first node corresponding to disc $j_1$ and the $k^{th}$ node corresponding to disk $j_2$. The first step 44 is to set l to k−1. Then there is a synchronous baton pass of a common video $V_l$ from the disk corresponding to node l to the disk corresponding to node l+1 in step 45. This common video must exist by the definition of G. Next, in step 46, l is decremented by one. This is followed in step 47 by a decision as to whether l is greater than or equal to 1. If it is, the process loops back to step 45; otherwise, the process stops and a return is made to the main program as shown in FIG. 3.

For a single arc, baton passing can be accomplished via some sort of synchronization primitive. For a path of length greater than one, it should be performed in reverse order; that is, from the last arc back through the first. This avoids overloading any disks, even temporarily. The net effect will be to add one stream to the final disk in the path, remove one stream from the initial disk in the path, and have no net effect on any other disks. The process may be described as "dancing backwards".

The process as illustrated in FIGS. 3 and 4 has a main routine and one subroutine. The main routine is as follows:

```
Procedure: MAIN
    Do while B>T
    Call SUB
    If SUB returns (0) then stop
    Perform bookkeeping on indices, B, G, D1, D2
    End
End MAIN
```

The subroutine is as follows:

```
Procedure SUB:
    Do for j₁=1 to D₁
        Do for j₂=D to D−D₂+1 by −1
            If there exists a shortest path
            in G from j₁ to j₂ then transfer
            videos along this path using
            baton-passing and return (1)
        End
    End
    Return (0)
End SUB
```

This dynamic scheme has the effect of balancing the load to a larger degree than would be possible without transferring videos dynamically.

In summary, the dynamic phase scheme according to the invention determines optimal disk loads via optimization algorithm and reindexes disks via increasing values of $$\left| x_j - \sum_{i=j}^{M} \lambda_{ij} \right|,$$

the order being from most overloaded to most underloaded where, according to the notation used, the first $D_1$ disks are overloaded and the last $D_2$ disks are underloaded. The dynamic phase assumes a measure of badness $$B = \sum_{j=1}^{D} \left( x_j - \sum_{i=1}^{M} \lambda_{ij} \right)^2$$

and a badness threshold T then uses an improvement routine to tune up the load when badness threshold is exceeded.

Figure 5:
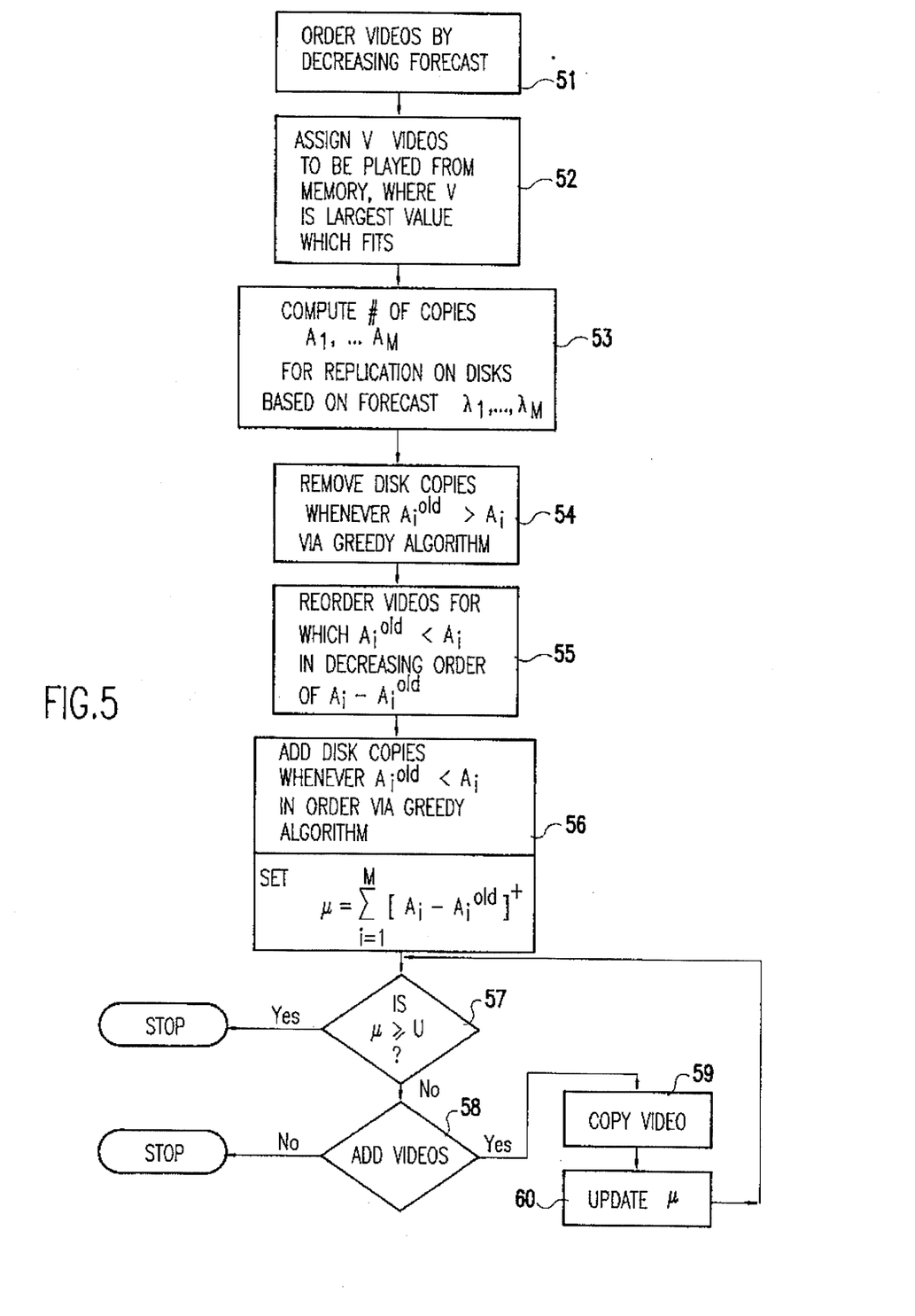
FIG. 5 is a flow chart of the logic of the static phase "incremental" scheme of the invention.

The quality of optimal disk loads in the dynamic phase depends on video/disk assignments. FIG. 5 shows the process for the static phase of the invention. The first step 51 orders videos by decreasing forecasted demand. For the static phase, the videos in most demand are played from system memory, these videos being greedily assigned to system memory in step 52. The remaining M videos are now indexed in terms of decreasing forecasted play demand $\lambda_i$. Thus, $\lambda_1 \geq \ldots \geq \lambda_M$. The next step 53 is to compute the number of copies $A_i$ required for each such video i. There are two possible alternatives for doing this step. One possiblity is to let A denote the maximum allowable number of video disk copies in the entire multi-media server and make $A_i$ roughly proportional to $\lambda_i$ by solving the problem $$\hat{\alpha} = \max \left\{ \alpha | \sum_{i=1}^{M} \lceil \alpha \lambda_i \rceil \leq A \right\}$$

The solution can be obtained via a bracket and bisection algorithm, as described for example by W. Press, B. Flannery, S. Teukolsky and W. Vetterling in *Numerical Recipes*, Cambridge University Press. We then let 9 $A_i = \lceil \hat{\alpha} \lambda_i \rceil$ for each video i. The other possibility is to treat the problem as one of fair apportionment. Schemes for apportionment are treated for example, in T. Ibaraki and N. Katoh ("Resource Allocation Problems", MIT Press). One such appropriate scheme treated there is due to Webster.

The static phase has two possible modes. Mode 1 is "from scratch" and is used to configure a new system on which no videos have yet been placed onto disks. Mode 2 is "incremental" and is used on an approximately day by day basis to adjust existing video to disk assignments because of revised forecasts. The goal in both approaches is to increase the connectivity of the undirected graph H defined as follows:

Nodes are disks;

For each pair $j_1$ and $j_2$ of distinct nodes, there is an arc between $j_1$ and $j_2$ provided there exists at least one video $i_1$ for which (1) $\alpha_{i,j_1} = \alpha_{i,j_2} = 1$. This condition mimics condition (1) in the definition for the directed graph G. The notion is that H serves as a an effective sunogate for G, since a good dynamic phase scheme will typically ensure that conditions (2) and (3) in the definition of G will be satisfied whenever condition (1) is satisfied.

We attempt to increase connectivity by minimizing the diameter of the graph H. (The diameter of a graph is the largest distance between any pair of nodes.) In Mode 1, we accomplish this by generating a so-called clique-tree. Each node of the tree consists of a set of disks where each has a copy of a common video. This makes load shift possible among any two disks within a node based on a common video. Hence, we use the term clique-tree. We need to build this tree by assigning disks to the nodes and videos to the disks during the process. The tree is built by considering videos in order of decreasing forecasts on access frequencies. The copies of the most popular videos are first assigned to different disks, and these disks are mapped to the root node of the clique tree. (Each disk can contain one copy of a video.) We next consider the next "hottest" video (in terms of demand) with multiple copies. Again, different copies are assigned to different disks except one of the copies needs to be assigned to the disk of a node already in the clique tree. This is refened to as the connection copy as it provides connectivity to the clique tree. To minimize the number of load shifts or baton passing to balance the load, the new nodes are hung off as close to the root as possible. This is achieved by assigning the "connection" copy to a node closest to the root and having a disk with additional capacity. The process is repeated as long as there are disks remaining not included in the clique tree. The leaf nodes represent the less popular videos with replications. During the final stage of the tree building, the videos may have more copies (excluding the connection copy) than the disks remaining unassigned. The assignment of those copies which exceed the number of disks remaining unassigned will be addressed in the next step. After all disks are included in the clique tree, the remaining copies of the videos are assigned greedily to the disks, i.e., (i) for each pair of new copies, we choose from the set of disks with available space the pair of disks with maximal distance; and (ii) single copies of videos are placed on a disk so as to decrease the diameter (Observe, that if there are additional copies of that video, then the chosen disk becomes a member of a clique of disks which accommodate the other copies of that video. The remaining videos satisfy $A_j=1$ and have no effect on the diameter of H.).

In the following, we show the construction of the graph H, by first producing the clique-tree and then using a greedy scheme for reducing the diameter of the graph.

Example: Assuming a system of D=11 disks, with $L_j=2$, j=1, . . . ,D, and the number of videos is M=11, the number of copies of each video is given in the Table below.

| VIDEO ID | COPIES |
|----------|--------|
| A | 4 |
| B | 3 |
| C | 3 |
| D | 3 |
| E | 2 |
| F | 2 |
| G | 2 |
| H | 2 |
| I | 2 |
| J | 1 |
| K | 1 |

The assignment of video copies to disks after the initial stage (i.e., construction of the clique-tree) is given by the matrix $$a_{ij} = \begin{pmatrix} 1 & 1 & 1 & 1 & 0 & 0 & 0 & 0 & 0 & 0 & 0 & 0 & 0 \\ 1 & 0 & 0 & 0 & 1 & 1 & 0 & 0 & 0 & 0 & 0 & 0 & 0 \\ 0 & 1 & 0 & 0 & 0 & 0 & 1 & 1 & 0 & 0 & 0 & 0 & 0 \\ 0 & 0 & 1 & 0 & 0 & 0 & 0 & 0 & 1 & 1 & 0 & 0 & 0 \\ 0 & 0 & 0 & 1 & 0 & 0 & 0 & 0 & 0 & 0 & 1 & 0 & 0 \\ 0 & 0 & 0 & 0 & 1 & 0 & 0 & 0 & 0 & 0 & 0 & 1 & 0 \\ 0 & 0 & 0 & 0 & 0 & 1 & 0 & 0 & 0 & 0 & 0 & 0 & 1 \\ 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 \end{pmatrix}$$

Figure 6:
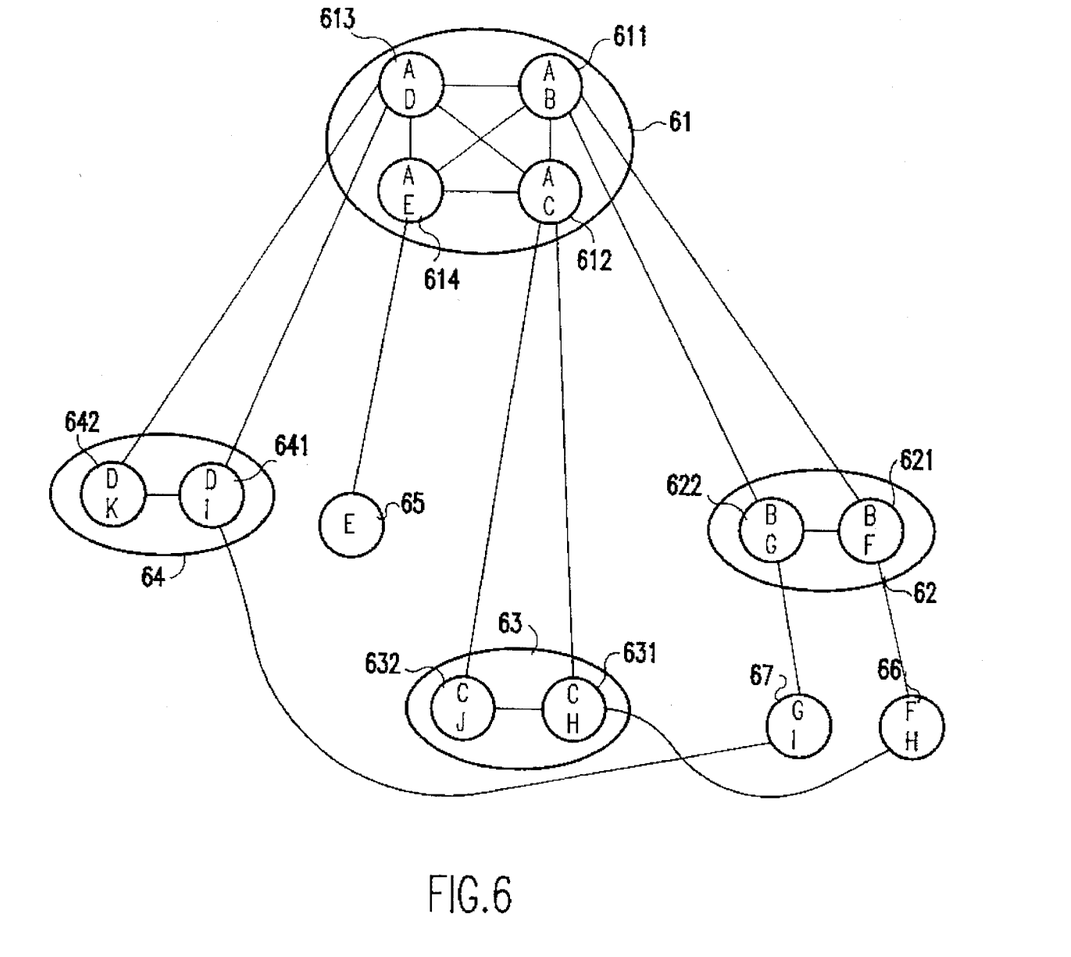
FIG. 6 is a functional block diagram showing an example of assignment of movies to disks in the system.

The graph H obtained after the greedy phase is shown in FIG. 6. With reference to the table above and FIG. 6, there are four copies of video A, one copy of which are assigned to each of disks 611, 612, 613, and 614. This group of four disks are the root 61 of the clique-tree. The next most popular video is video B which has three copies. One of these is assigned to disk 611 and serves as the connection copy of the video. The other two copies of the video B are assigned to disks 621 and 622, respectively. These two disks form a branch 62 of the clique-tree. Video C also has three copies, one of which is assigned to disk 612 to serve as a connection copy to branch 63 having disks 631 and 632 to which the other two copies of video C are assigned. Similarly, there are three copies of video D, one of which is assigned to disk 613 as a connection copy and the other two of which are assigned to disks 641 and 642 of branch 64. There are two copies of video E, and one copy is assigned to disk 614 while the other is assigned to disk 65. Here, the disk 65 represents a leaf of the clique-tree.

At this point in the assignment process, the capacities of the disks 611, 612, 613, and 614 have been reached so that it is no longer possible to assign connection copies of the next group of videos to the root 61 of the clique-tree. Therefore, one copy of video F is assigned to disk 621, and another is assigned to disk 66. Similarly, one copy of video G is assigned to disk 622 and another is assigned to disk 67. Disks 66 and 67, like disk 65, are leafs in the clique-tree. Next, the two copies of video H are assigned to disks 631 and 66, and the two copies of video I are assigned to disks 641 and 67. This leaves videos J and K for which there is one copy each. The one copy of video J is assigned to disk 632, and the one copy of video K is assigned to disk 642.

The foregoing is but an example of an initial assignment of videos to disks. Obviously, depending on the number of videos, the numbers of copies of each video and the number and capacities of the disks, the assignments of videos to disks will vary. The point of the example is to illustrate a situation where the baton passing technique may be used to balance the loads between two disks which may not have common copies videos. Suppose, for example, that disk 611 is overloaded and disk 66 is underloaded. Observe that there are no common copies of videos on these two disks; however, disk 621 has copies in common between disks 611 and 66. The baton passing in this case is to transfer demand for video F from disk 621 to disk 66 and then to transfer demand for video B from disk 611 to disk 621. This "dancing backwards" prevents any overload condition on the intermediate disk 621, even temporarily. The net effect is to increase by one the video stream output of disk 66, decrease by one the video stream of disk 611, and have no net effect on the video stream output of disk 621.

In Mode 2, some videos will lose disk copies, some will gain disk copies, and some of the video copies may be moved from disk to disk. We keep track of the net number of new video copies on disk, which we force to be bounded by some fixed threshold U.

The procedure has three stages, accomplished in the following order. In stage 1, we greedily remove disk copies from net-loss videos, in order from greatest to least loss. In stage 2, we greedily add disk copies to net-gain videos, in order from greatest to least gain, with constraints on disk storage capacity. We then compute the number of new video copies. If this number is greater than or equal to U, we stop. Otherwise, we perform stage three, a neighborhood escape heuristic on the entire set of video copies. The neighborhood escape heuristic used is described by J. Wolf in "The Placement Optimization Program", ACM Sigmetrics Conference, Berkeley Calif., 1989. This includes single moves (which are distance 1), swaps (which are distance 2), and so on, with constraints on disk storage capacity. If either (1) no further improvements to the diameter of H are possible, or (2) the number of moves exceeds U, we stop. In the latter case, we abort the final move decision. Minimizing the diameter of H makes the dynamic phase scheme more effective by increasing its flexibility. Even a modest number of videos with multiple copies will ensure good connectivity for H.

Referring again to FIG. 5, in step 54 disk copies are removed whenever $A_i^{old}$ is greater than $A_i$ using a greedy algorithm. Here $A_i^{old}$ represents the old number of required disk copies of video i, while $A_i$ represents the new number. Then, in step 55 the videos are reordered for each $A_i^{old}$ less than $A_i$ in decreasing order of $A_i - A_i^{old}$. Disk copies of videos are added in step 56 whenever $A_i^{old}$ is less than $A_i$ in order. This is done via a greedy algorithm. Then, μ is set to $$\sum_{i=1}^{M}(A_i - A_i^{old})^+.$$

(The + function is defined by $x^+ = x$ if $x \geq 0$, and $x^+ = 0$ if $x \leq 0$.) A decision is made in step 57 as to whether μ is greater than or equal to U. If so, the process stops; otherwise, a decision is made in step 58 as to whether new video copies are to be added using the neighborhood escape heuristic described by J. Wolf, supra. If not, the process stops; otherwise, a video is copied in step 59 and then μ is updated in step 60 before the process loops back to step 57.

In summary, the static phase modes are from scratch and incremental. The from scratch mode is used only when configuring new system. Forecasts are used to determine memory resident videos and number of disk copies for remaining videos. The approach is to build clique-tree, employing a greedy strategy, taking into account constraints on disk storage capacity. The incremental mode is used in normal day-to-day operation. The incremental mode uses revised forecasts to update memory resident videos and adjust number of disk copies for remaining videos. There is a three part approach to the incremental mode using greedy strategy and a neighborhood escape heuristic. For net loss videos, a greedy determination is made as to which copies of videos should be erased. For net gain videos, a greedy determination is made as to where new copies should be placed, taking into consideration the constraint on disk storage capacity. A neighborhood heuristic is used for moving all video copies, taking into consideration constraints on the number of disk moves and disk storage capacity.

The configuration planning problem is essentially the dual to the load balancing problem. It can be accomplished using the same basic technique by (1) developing a suite of video load simulation tests, (2) exploring the search space for memory and disk configurations which pass these tests, and (3) picking that configuration which satisfies (2) and has minimal cost.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A video on demand computer system, comprising:

a multimedia file server having memory for storing a limited number of videos;

a plurality of storage media connected to said multimedia file server, each of said storage media storing a plurality of videos; and performance means, connected said multimedia file server, for performing selected ones of the videos for users responsive to received user performance request;

said multimedia file server including a central processing unit programmed to monitor numbers of videos being performed for each of the storage media and, based on the programmed monitoring operation, dynamically transferring the performance of a video in progress from one of the storage media to another storage media having a copy of the video in progress so as to balance the loads of the plurality of storage media wherein said central processing unit is further programmed to periodically perform a static reassignment of videos between said system memory and the storage media and between the storage media by transferring videos between memory and the storage media and between the storage media to optimize load balancing based on the user performance requests for each of the videos.

2. The computer system of claim 1 wherein said central processing unit performs load balancing between any pair of storage media through a sequence of load shifts across different storage media such that each shift causes the transfer of the performance of a video from one of the storage media (the source) to another storage media (the target) having a copy of the video being shifted and the source storage media becomes the target storage media for the next load shift.

3. The computer system of claim 2 wherein the load balancing performed by said central processor is by balancing loads across the storage media through balancing loads between pairs of overloaded and underloaded storage media.

4. The computer system of claim 2 wherein the static reassignment of videos by the central processor is performed by assigning videos to storage media to increase the availability of load shift sequences between any pair of storage media and shortening the length of a sequence.

5. The computer system of claim 1 further comprising configuration planning means to decide system memory and storage media requirement for a predetermined number of videos to minimize cost of the system.

6. A method of providing videos on demand in a multimedia computer system comprising the steps of:

assigning videos to system memory and a plurality of storage media according to forecasts of demands for videos, each of said storage media storing a plurality of videos, said assigning including determining a number of copies of each video to be stored in said storage media with only one copy of any video on a single storage media;

performing selected ones of the videos for users on demand in response to user performance request;

monitoring numbers of videos being performed for each of the storage media;

dynamically balancing the loads of said storage media by transferring the performance of a video in progress from one of the storage media to another storage media having a copy of the video in progress; and periodically performing a static reassignment of videos between said system memory and the storage media and between the storage media by transferring videos between memory and the storage media and between the storage media to optimize load balancing based on the user performance requests for each of the videos.

7. The method of claim 6 wherein the step of dynamic load balancing is performed through a sequence of load shifts across different storage media such that each shift causes the transfer of the performance of a video from one of the storage media (the source) to another storage media (the target) having a copy of the video being shifted and the source storage media becomes the target storage media for the next load shift.

8. The method of claim 7 wherein the step of dynamic load balancing is further performed by balancing loads between pairs of overloaded and underloaded storage media.

9. The method of claim 7 wherein the step of performing a static reassignment is performed by assigning videos to storage media to increase the availability of load shift sequences between any pair of storage media and shortening the length of a sequence.

* * * * *